Figure 1:
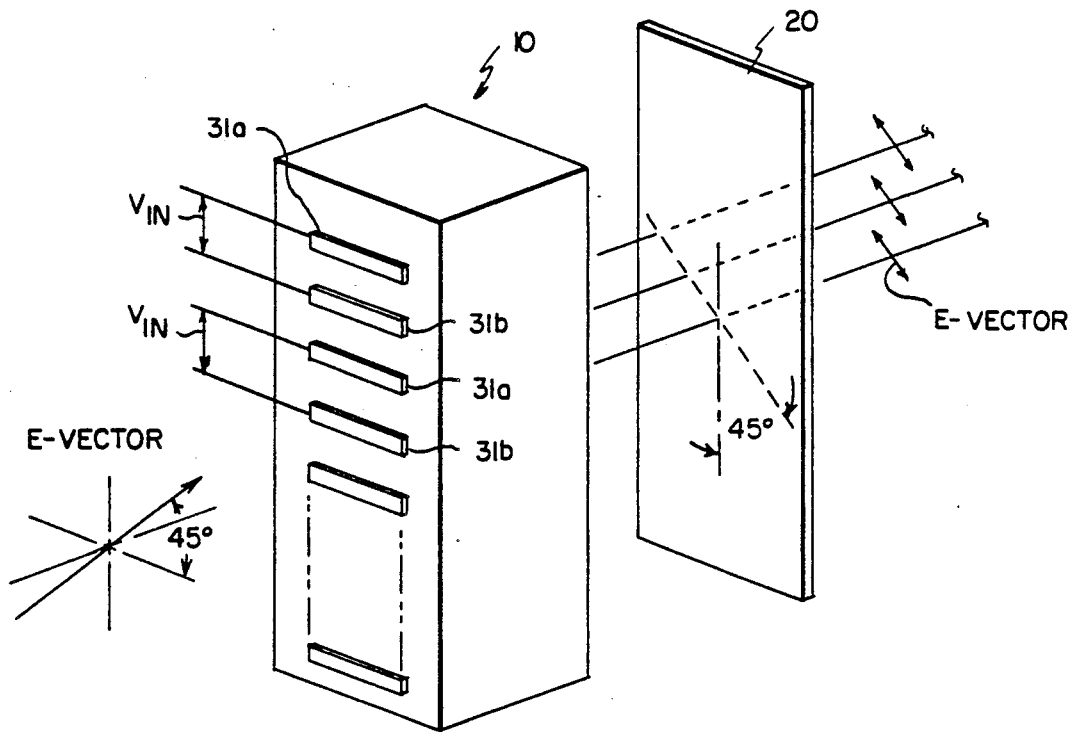

United States Patent [19]

Agostinelli

[11] Patent Number: 4,998,805
[45] Date of Patent: Mar. 12, 1991

[54] ELIMINATION OF FIELD-INDUCED INSTABILITIES IN ELECTROOPTIC MODULATORS

[75] Inventor: John A. Agostinelli, Rochester, N.Y.

[73] Assignee: Eastman Kodak Company, Rochester, N.Y.

[21] Appl. No.: 203,515

[22] Filed: May 2, 1988

Related U.S. Application Data

[63] Continuation of Ser. No. 702,542, Feb. 19, 1988, abandoned.

[51] Int. Cl.[5] .............................................. G02F 1/01
[52] U.S. Cl. ..................................... 350/355; 350/359
[58] Field of Search .................. 332/7.51; 357/72, 73; 350/392, 398, 589, 590, 355, 359; 361/282, 321; 455/350

[56] References Cited

U.S. PATENT DOCUMENTS

| 3,563,631 | 2/1971 | Sledge | 350/392 |
|---|---|---|---|
| 3,709,765 | 1/1973 | Miles | 350/589 |
| 3,744,875 | 7/1973 | Haertling et al. | 350/392 |
| 3,933,407 | 1/1976 | Tu et al. | 350/582 |
| 3,935,367 | 1/1976 | Merrill et al. | 428/336 |
| 3,969,743 | 6/1976 | Gorski | 357/72 |
| 3,997,690 | 12/1976 | Chen | 427/165 |
| 4,068,923 | 1/1978 | Toida | 350/356 |
| 4,158,201 | 6/1979 | Smith et al. | 365/145 |
| 4,217,160 | 8/1980 | Perregaux | 350/398 |
| 4,348,611 | 9/1982 | Ruppel et al. | 361/282 |
| 4,352,961 | 10/1982 | Kumada et al. | 455/350 |
| 4,406,521 | 9/1983 | Mir et al. | 350/392 |
| 4,422,738 | 12/1983 | Ditzik | 350/356 |
| 4,457,598 | 7/1984 | Shimabukuro et al. | 350/590 |
| 4,472,730 | 9/1984 | Ohta | 357/72 |
| 4,511,705 | 4/1985 | Makino | 357/72 |
| 4,519,401 | 5/1985 | Ko et al. | 73/721 |
| 4,555,161 | 10/1985 | Rowland | 350/590 |
| 4,611,886 | 9/1986 | Cline et al. | 357/72 |
| 4,617,584 | 10/1986 | Ikeya et al. | 357/72 |
| 4,618,878 | 10/1986 | Aoyama et al. | 357/72 |
| 4,636,578 | 1/1987 | Feinberg | 357/72 |
| 4,636,908 | 1/1987 | Yoshihara et al. | 361/321 |
| 4,642,513 | 2/1987 | Nyol et al. | 357/72 |

OTHER PUBLICATIONS

Xerox Disclosure Journal, vol. 8, No. 3 (May/Jun. 1983), pp. 281-282, Fay et al, Inexpensive Optical Recording with Hermetic Seal.

Primary Examiner—Salvatore Cangialosi
Attorney, Agent, or Firm—John D. Husser

[57] ABSTRACT

An electrooptic modulator having a electrooptic substrate and a transparent water impermeable layer formed on a surface of such substrate after absorbed water was removed from such substrate surface. This layer prevents adsorbed water from forming on the substrate surface which could cause the appearance of surface charge that would affect the operation of the modulator.

9 Claims, 1 Drawing Sheet

ELIMINATION OF FIELD-INDUCED INSTABILITIES IN ELECTROOPTIC MODULATORS

This is a continuation of application Ser. No. 06/702,542 filed 02/19/85 now abandoned.

BACKGROUND OF THE INVENTION

1. Field of the Invention

The present invention relates to the elimination of field-induced instabilities in electrooptic modulator arrays for use in light valve arrays.

2. Description of the Prior Art

Electrooptic materials are those whose optical properties change in accordance with the strength of an electric field established within them. These materials make possible an electrically controlled electrooptic modulator array for use in a light valve array.

One example of a preferred electrooptic material frequently used as the substrate in electrooptic modulator arrays is lanthanum-doped lead zirconate titanate (PLZT). Without an electric field being established, some compositions of PLZT are optically isotropic, while others exhibit a static birefringence. In either case, when an electric field is applied through a substrate of PLZT, the PLZT crystal structure changes. This change in crystal structure causes a change in birefringence. An optic axis is thereby formed which is aligned parallel to the electric field lines.

The light valve array includes a modulator array and an analyzer. The modulator array often has a PLZT substrate with a plurality of spaced electrodes on one of its surfaces. Upon the application of a voltage across a pair of electrodes, an electric field is established in a portion of the PLZT substrate which is called a pixel portion, and the PLZT substrate becomes birefringent and changes the state of polarization of incident plane polarized light. If a phase shift of 180° is introduced between orthogonal polarizations (E vectors) of plane polarized light entering and exiting the birefringent substrate, then the voltage applied is called the half wave voltage. If the incident light is plane polarized, with the E vector being at 45° to the induced optic axis, then plane polarized light with its E vector rotated 90° with respect to the incident polarization E vector will emerge from the substrate. In this case a maximum amount of light will be transmitted by an analyzer crossed with the polarization direction of the light incident on the substrate. Unfortunately, after being operated, modulator arrays often exhibit light transmission drifts.

SUMMARY OF THE INVENTION

The object of this invention is to provide an electrooptic modulator array in which light transmission drifts are reduced. The object is accomplished by providing a modulator array having an electrooptic substrate, and a water impermeable layer overcoating the substrate surface, with such layer having been applied after adsorbed water was removed from the substrate surface.

3. BRIEF DESCRIPTION OF THE DRAWINGS

Figure 2:
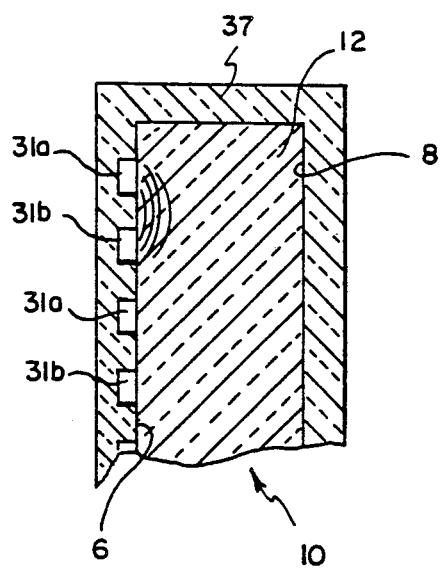

FIG. 1 is a schematic perspective illustrating a light valve array having an electrooptic modulator array and an analyzer; and FIG. 2 is a partial side sectional view of the modulator array of FIG. 1.

4. DETAILED DESCRIPTION OF THE PREFERRED EMBODIMENTS

As shown in FIG. 1, there is provided a light valve array having an electrooptic modulator array 10 and an analyzer 20 in accordance with the invention. The dotted line across the analyzer 20 indicates the direction of the plane polarized light electric vector (E-vector) transmitted by the analyzer 20. As shown in FIG. 2, the modulator array 10 includes a substrate 12 formed of an electrooptic material, preferably an optically isotropic PLZT which changes its birefringence in response to the establishment of an electric field in the substrate. A single input light beam of monochromatic plane polarized light is incident normally upon the surface of the substrate 12 from the left, as shown, and exits at the right as a plurality of beams. As shown the polarization or E-vector is perpendicular to the direction of travel of the light beam. The input light beam may be produced by any of several means (not shown) which are well known in the art, such as a laser, or an incandescent light source with a polarizer.

The modulator array 10 includes a plurality of pixel portions. Each pixel portion is formed between adjacent electrodes 31a and 31b. Plane polarized light which passes through a particular pixel portion of the modulator array is formed into a beam. Each beam of light which is transmitted by the analyzer 20 addresses a pixel contained in a corresponding pixel region at an image zone (not shown) where the light is focused.

As shown in FIG. 2, the substrate 12 has first and second substantially parallel surfaces 6 and 8, respectively. All the electrodes are mounted on the surface 6. The lines between electrode 31a and electrode 31b represent electric field lines for a pixel portion. All the electrodes can be built into the substrate or they can be deposited as shown directly on the substrate surface by any of several means well-known in the art such as vacuum deposition of metal and photolithography. While the electrodes may be formed of any suitable material, metals such as chrome-gold, titanium-gold, and chrome-nickel-gold are particularly effective.

Referring again to FIG. 2, a single pixel portion is defined by the electric field applied between a pair of adjacent electrodes 31a and 31b on the first surface 6 of the substrate 12. A voltage is applied across an adjacent pair of electrodes 31a and 31b and establishes the electric field. Preferably, the electrodes of a pixel portion are arranged so that these electric field lines and their established optic axes are oriented at 45° angles relative to the E-vector of the received polarized light and are substantially perpendicular to the incidence direction of such received light. The voltage Vin is preferably selected to be either zero volts or the half wave voltage.

Information of a pixel portion is modulated by controlling Vin. When no voltage (Vin is zero) is applied across a pair of electrodes 31a and 31b, the plane of polarization is not changed and the analyzer 20 blocks the polarized light passing through that pixel portion. However, when the voltage Vin is the half-wave voltage, the electric field as shown in FIG. 2 is established. The plane of polarization of a plane polarized light beam in such a pixel portion is changed by 90° and light is passed by the analyzer 20.

After being operated, it has been found that light valve arrays exhibit field-induced light transmission drifts which are different from the well known photo-induced space charge drifts. Field-induced drifts occur even when a light valve is operated at very low light levels. To achieve stable light intensity output, field-induced drifts are compensated for by varying with time the amplitude of the voltage applied across each pair of electrodes. The problem is compounded by the fact that different modulator array pixel portions often have light transmission drifts which vary differently with time, thus increasing the nonuniformity of the intensities of the different light beams transmitted by the light valve array. In addition to the drift in light transmission for each pixel portion at a given applied voltage, there is also an increase in light transmission for each pixel portion when the applied voltage is brought to zero, thereby reducing light valve contrast.

In accordance with this invention, there is provided an electrooptic modulator array in which no change is needed, after repeated operation of the array, in the amplitude of the applied voltage across each pair of modulator array pixel portion electrodes to change the plane of polarization (E vector) of incident plane polarized light by 90°.

It has been discovered that the variation in the change of plane polarized light (E vector) passing through a pixel portion results from the accumulation of charge on a surface of the modulator substrate. This is the field-induced instability. It has also been discovered that the appearance of surface charge directly correlates with the presence of adsorbed water on the PLZT substrate surface.

In accordance with the present invention, a water impermeable layer 37 has been formed on the substrate 12. The term "water impermeable" means that water is prevented from reaching surface 6. It is directly coated on all the surfaces of the substrate 12 and over the electrodes 31a and 31b. Layer 37 isolates the surfaces of substrate 12 from the environment and prevents adsorbed water and the accumulation of charge on the substrate surface 6.

It has been determined that the field-induced instability results from the accumulation of charge on the PLZT substrate surface 6 between electrodes 31a and 31b. The other substrate surfaces may also collect charge that can cause the instability. Preferably, they are all overcoated.

We have confirmed that the instability of a light valve may be attributed to the field-induced instability by testing for the presence of surface charge. This was accomplished by wiping a surface of a pixel portion of the modulator 10 with a suitable material, e.g. an alcohol moistened swab which removes surface charge. Comparison of light valve behavior before and after wiping revealed whether or not charge existed on that surface.

The appearance of surface charge correlates with the presence of adsorbed water on the PLZT surface. PLZT adsorbs water from the atmosphere and this results in the buildup of charge. This can be shown by moistening that portion of surface 6 on substrate 12 which collects charge. The level of charge on the surface 6 will increase. The field induced instability can be easily eliminated by removing adsorbed water from the PLZT surface 6 and then overcoating such surface 6 with a transparent, water impermeable layer. Adsorbed water can be removed by placing an electrooptic modulator array in a chamber having a dry nitrogen atmosphere which is heated to a temperature of more than 100° C. The modulator is lift in..the chamber until the adsorbed water is removed. The dvercoating layer is then deposited in this nitrogen atmosphere. The layer 37 can be formed by many techniques including dip coating, spin coating or spraying. The layer 37 preferably should be electrically insulating, transparent, optically isotropic and water impermeable. It should have a uniform thickness to prevent the refraction of light. An example of an effective material that has been used is acrylic coating #MS-465 manufactured by Miller-Stephenson Corporation of Danbury, Conn. This material is highly insulative and prevents current from flowing through the layer 37 between adjacent electrodes.

The invention has been described in detail with particular reference to a preferred embodiment thereof, but it will be understood that variations and modifications can be effected within the spirit and scope of the invention.

I claim:

1. A method of fabricating a modulator for use in a light valve device, said method comprising:
    (a) forming a metal pattern of spaced address and reference electrode portions on a surface of a ferroelectirc ceramic substrate;
    (b) heating said substrate to remove moisture from said electroded surface; and
    (c) coating said electroded surface with a transparent, water impermeable and a electrically insulative protective layer.

2. A method of fabricating a modulator for use in a light valve device, said method comprising:
    (a) forming a metal pattern of spaced electrodes on one face of a ferro-electric ceramic substrate,
    (b) heating said substrate in a nitrogen atmosphere to remove moisture from the surface of said electroded substrate face; and
    (c) coating the electroded substrate face with an electrically insulative, water impermeable layer.

3. A method of minimizing field induced instabilities in a PLZT modulator element which has a plurality of electrodes formed in spaced relation across one element face in a manner forming modulator pixel portions, said method comprising the steps of:
    (a) releasing adsorbed water from said electroded face of said element; and
    (b) overcoating at least the pixel portions of said electroded element face with a transparent, electrically insulative, water impermeable layer to prevent water from being adsorbed thereby.

4. The method of claim 3, wherein the step of releasing comprises heat treating at a temperature of greater than 100° C.

5. A method of preparing a PLZT modulator array for use in a light valve array, comprising the steps of:
    (a) drying the PLZT modulator in a controlled atmosphere to remove adsorbed water from an electroded surface of the modulator; and
    (b) depositing at optically isotropic, transparent, water impermeable layer on said electroded surface.

6. The method of claim 5, wherein said water impermeable layer is an acrylic composition.

7. The method of claim 6, wherein said acrylic composition is electrically insulating and substantially isotropic and transparent.

8. An improved electrooptic modulator comprising:

(a) a substrate formed of a ferro-electric ceramic material which changes its birefringence in response to an electric field;
(b) a plurality of electrode means, located in spaced relations across a surface of said substrate, for selectively applying potentials to establish discrete electric fields in selected pixel portions of said substrate; and
(c) a transparent, water impermeable layer overcoating at least said electorde means and said pixel portions of the surface of said substrate surface defined between said electrode means;

the region between said overcoating layer and said electrode means/substrate surfaces being heat treated so as to be substantially free of moisture.

9. In an electooptic modulator array for use in a light valve device and including a PLZT substrate formed of electrooptic material which changes its birefringence in response to an electric field; an plurality of electrodes spaced across a surface of said substrate to define a plurality of pixel portions in such substrate, said electrodes being responsive to voltage signals to establish through selected ones of said pixel portions electric fields which cause each of said selected pixel portions to change the plane of polarization of a light beam, the improvement comprising a moisture impermeable, electrically insulating, optically isotropic, transparent layer which has been formed on said substrate surface pixel portions after a moisture removal heating of said surface, whereby moisture-induced field instabilities are substantially eliminated during operation of said array.

* * * * *